United States Patent [19]
Yoshihara

[11] Patent Number: 5,684,995
[45] Date of Patent: Nov. 4, 1997

[54] SEGMENT DIVISION MANAGEMENT SYSTEM

[75] Inventor: Shinji Yoshihara, Tokyo, Japan

[73] Assignee: NEC Corporation, Tokyo, Japan

[21] Appl. No.: 360,291

[22] Filed: Dec. 21, 1994

[30] Foreign Application Priority Data

Dec. 24, 1993 [JP] Japan .................................. 5-326771

[51] Int. Cl.⁶ .............................. G06F 12/00; G06F 12/08
[52] U.S. Cl. ................... 395/710; 395/427; 395/497.01; 395/497.03; 395/410; 395/413; 395/416; 395/418; 395/419
[58] Field of Search ............................ 395/419, 700, 395/410, 413, 416, 418, 427, 497.01, 497.03

[56] References Cited

U.S. PATENT DOCUMENTS

| | | | |
|---|---|---|---|
| 4,660,130 | 4/1987 | Bartley et al. | 364/200 |
| 4,730,249 | 3/1988 | O'Quin, II et al. | 364/200 |
| 4,761,737 | 8/1988 | Duvall et al. | 364/300 |
| 5,058,003 | 10/1991 | White | 364/200 |
| 5,375,214 | 12/1994 | Mirza et al. | 395/400 |
| 5,426,752 | 6/1995 | Takahasi et al. | 395/400 |
| 5,428,759 | 6/1995 | Smith et al. | 395/400 |
| 5,481,688 | 1/1996 | Takagi | 395/418 |

OTHER PUBLICATIONS

"Operating Systems A Systematic View", Davis, W.S., Addison–Wesley Publishing Company, 1987, pp. 298–319.

*Primary Examiner*—Kevin A. Kriess
*Assistant Examiner*—Kakali Chaki
*Attorney, Agent, or Firm*—Foley & Lardner

[57] ABSTRACT

One physical segment 30 is divided into a plurality of fixed-length logic segments 31, where a logic segment management table 22 for management each logic segment 31 is provided. In registering a subprogram 40, a smaller sized region is assigned to the logic segment 31 by a segment size decision means 11, a logic segment producing means 12, and a logic segment register means 13. In deleting the subprogram 40, the logic segment 31 which comes to a not-use status is deleted by a logic segment retrieval means 14 and a logic segment delete means 15.

8 Claims, 4 Drawing Sheets

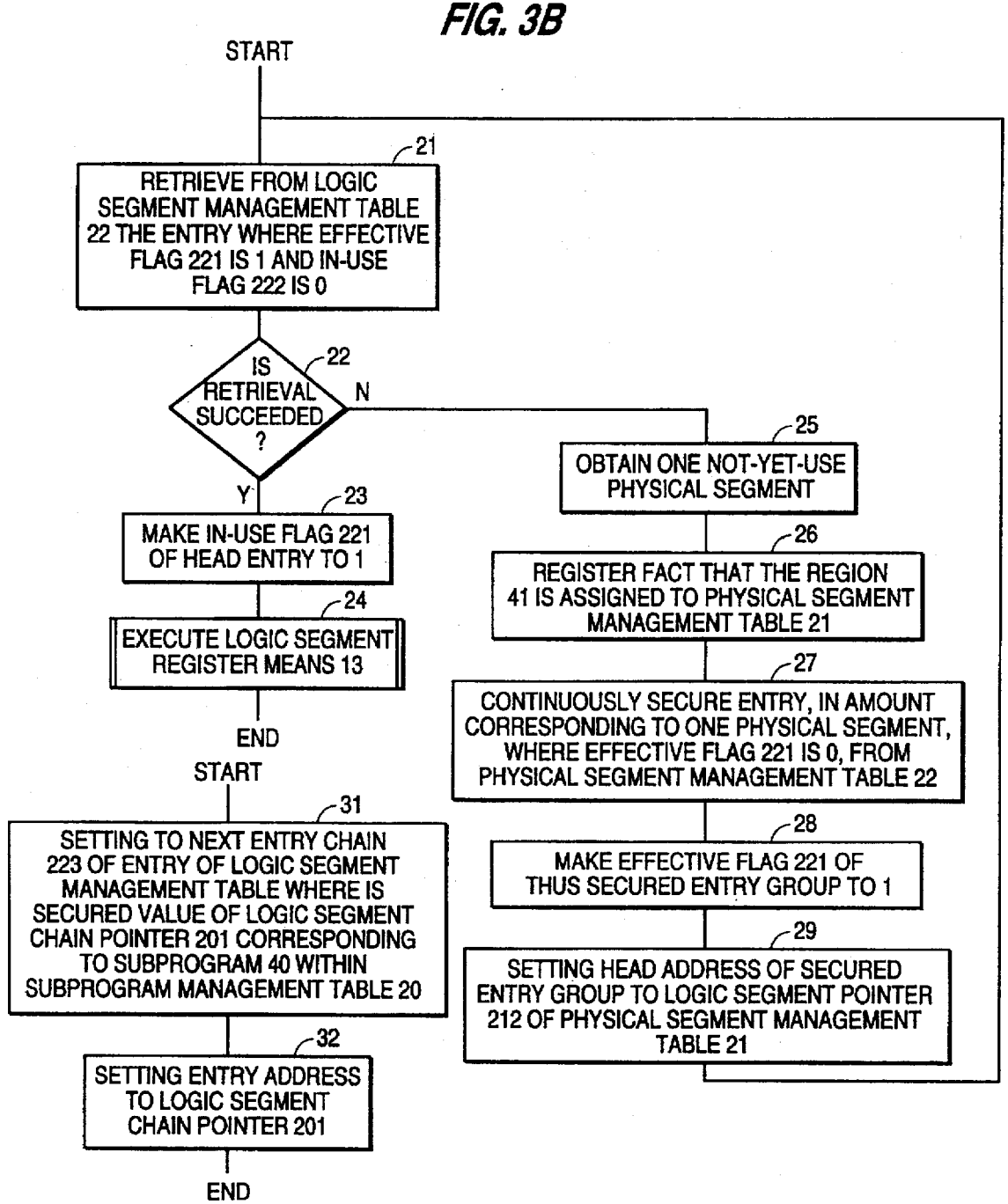

1

SEGMENT DIVISION MANAGEMENT SYSTEM

I. FIELD OF THE INVENTION

The invention relates to a virtual storage management system by a segmentation system, and in particular relates to a segment division management system which a subprogram dynamically links to a main program.

II. DESCRIPTION OF THE RELATED ART

As shown in "ACOS-4/XVP Supervisor Reference Manual, DDA82E-2, NEC Corporation, 1992", a problem resides in the conventional segmentation system whose dynamic linkage function in the virtual storing system assigns one physical segment constituting the virtual storing system to one sub-program, and therefore in the case of the smaller sub-program, most of the physical segments come to a not-yet-use region, resulting in reducing its efficiency.

SUMMARY AND OBJECT OF THE INVENTION

An object of the invention is to upgrade utilization efficiency of virtual storage space.

Another object of the invention is to improve utilization efficiency of a physical segment constituting a virtual storage space.

Further another object of the invention is, on dynamic linking of a sub-program, to enable a greater number of sub-programs to utilize a virtual storage space without lack resulting in a of virtual storage space.

A segment division management system according to a first aspect of the invention comprises a construction as follows.

In a computer system employing a virtual storage management system by a segmentation system;

a physical segment is a unit constituting a virtual storage space;

a logic segment is a unit obtained by dividing the physical segment into a plurality of optional fixed lengths;

a sub-program is a program with dynamic linking to a main program;

a segment size decision means compares a size of a region which the sub-program possesses with the size of the logic segment;

and when the segment size decision means determines that a size of region of the sub-program possesses is smaller than the size of the logic segment, a logic segment producing means assigns the not-yet-use logic segment to the region which the subprogram possesses.

A segment division management system of a second aspect of the invention comprises a construction as the following.

A logic segment retrieval means retrieves the logic segment on which the subprogram to be deleted is assigned, and a logic segment release means returns the logic segment to a not-yet-use status.

A segment division management system of a third aspect of the invention comprises a construction as the following.

In a computer system employing a virtual storage management system by a segmentation system;

a physical segment is a unit constituting a virtual storage space;

a logic segment is a unit obtained by dividing the physical segment into a plurality of optional fixed lengths;

a subprogram is a program with dynamic linking to a main program;

and if a segment size decision means, comparing a size of the region which the subprogram possesses with the size of the logic segment, determines that the size of the region which the subprogram possesses is larger than the size of the logic segment, a not-yet-use physical segment is assigned to the region which the subprogram possesses.

and when the segment size decision means determines that a size of region which the subprogram possesses is smaller than the size of the logic segment, a logic segment producing means assigns the not-yet-use logic segment to the region which the subprogram possesses.

A segment division management system of a fourth aspect of the invention comprises a construction as the following.

A logic segment retrieval means retrieves the logic segment on which the subprogram to be deleted is assigned, and a logic segment release means returns the logic segment to a not-yet-use status.

A segment division management system of a fifth aspect of the invention comprises a construction as the following.

In a computer system employing a virtual storage management system by a segmentation system;

a physical segment is a unit constituting a virtual storage space;

a logic segment is a unit obtained by dividing the physical segment into a plurality of optional fixed lengths;

a physical segment management table is stored with related information of the physical segment and the logic segment;

a logic segment management table is stored with information of the each logic segment and related information between the logic segments;

a subprogram is a program which is dynamic-linked to a main program;

a subprogram management table is stored with related information between the subprogram and the logic segment;

and when the size of the region which the segment size decision means possesses determines that a size of region of the subprogram possesses is smaller than the size of the logic segment, a logic segment producing means retrieves the not-yet-use logic segment from the logic segment management table, and assigns such logic segment to the region which the subprogram possesses, and registers to the physical segment management table the fact that the physical segment is assigned to the region, and and when the segment size decision means determines that a size of region of the subprogram possesses is smaller than the size of the logic segment, a logic segment producing means retrieves a not-yet-use logic segment from the logic segment management table, and assigns such logic segment to the region which the subprogram possesses, and a logic segment register means registers to the subprogram management table a fact that the logic segment is assigned to the subprogram.

A segment division management system of a sixth aspect of the invention comprises a construction as the following.

A logic segment retrieval means retrieves the logic segment on which the subprogram to be deleted is assigned, and a logic segment release means returns the logic segment to a not-yet-use status.

A segment division management system of a seventh aspect of the invention comprises a construction as the following.

In a computer system employing a virtual storage management system by a segmentation system;

a physical segment is a unit constituting a virtual storage space;

a logic segment is a unit obtained by dividing the physical segment into a plurality of optional fixed lengths;

a logic segment management table includes an effective flag designating whether or not each entry constituting each logic segment is effective, an in-use flag designating whether or not each entry is now in use, and a next entry chain which is a pointer showing a next entry;

a physical segment management table includes an in-use flag designating whether or not each physical segment is now in use, a logic segment presence flag designating whether or not a logic segment corresponding to each physical segment is present, and a logic segment management pointer which is a pointer to an entry of the logic segment management table corresponding to each physical segment;

a subprogram is a program which is dynamic-linked to a main program;

a subprogram management table includes a logic segment chain pointer which is a pointer to the logic segment to which the subprogram is assigned;

and if a segment size decision means, comparing the region which the subprogram possesses with the size of the logic segment, determines that the size of the region which the subprogram possesses is larger than the size of the logic segment, the not-yet-use physical segment is assigned to the region which the subprogram possesses, and the in-use flag of an entry corresponding to the physical segment of the physical segment management table is rendered to a in-use status;

and when the size of the region which the segment size decision means possesses determines that a size of region of the subprogram possesses is smaller than the size of the logic segment, a logic segment producing means proceeds to retrieve an entry in which the effective flag is effect and the in-use flag is not in use, from the logic segment management table, and when failing to retrieve the entry, the logic segment producing means proceeds to assign the not-yet-use physical segment to a region which the subprogram possesses, to render into an in-use status the in-use flag of an entry corresponding to the physical segment of the physical segment management table, simultaneously to render the logic segment presence flag to a presence status, further to continuously secure from the logic segment management table an entry, in an amount corresponding to one physical segment, where the effective flag is not effect, furthermore to render the effective flag of the entry group to be effective, to render the in-use flag of the entry group to be an in-use status, and to set a head address of the entry group to the logic segment management pointer of the entry of the physical segment management table; and a logic segment register means sets in that a head address of an entry corresponding to the subprogram of the logic segment management table is set to the logic segment chain pointer of an entry corresponding to the subprogram of the subprogram management table.

A segment division management system of a eighth aspect of the invention comprises a construction as the following.

A logic segment retrieval means retrieves all entries, corresponding to the subprogram within the logic segment management table, which are designated by the logic segment chain of the entry within the subprogram management table corresponding to the subprogram to be deleted, and a logic segment release means renders the in-use flag of all the entries which the logic segment retrieval means retrieve to be a not-in-use status, further set NULL to the next entry chain.

BRIEF DESCRIPTION OF THE DRAWINGS

The invention will be understood more fully from the detailed description given here below and from the accompanying drawings of preferred embodiments of the invention, which, however, should not be considered as limiting the invention but are for explanation and understanding only.

FIG. 3B is a flow chart showing the processes of logic segment producing means 12 and logic segment register means 13 of FIG. 1 in an embodiment according to the invention.

Here, it should be noted that like reference numerals represent like elements throughout the disclosure.

DETAILED DESCRIPTION OF THE PREFERRED EMBODIMENT

Figure 1:
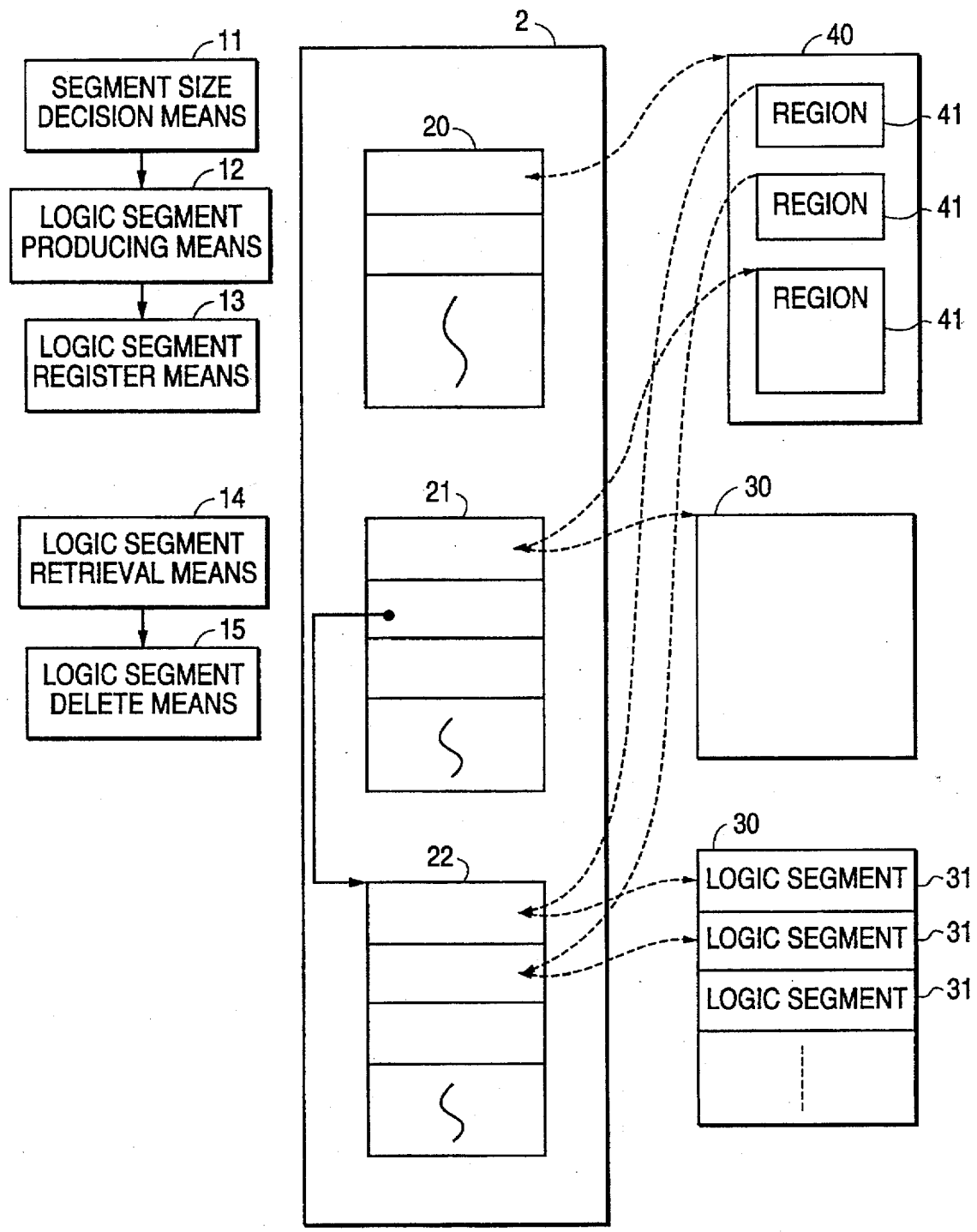
FIG. 1 is a block diagram showing an embodiment according to the invention.

In FIG. 1, a segment division management system of an embodiment according to the invention comprises: a subprogram 40 having a plurality of regions 41, a physical segment 30 and a logic segment 31 with an optional fixed length included therein, a segment size decision means 11 for comparing the size of the region 41 of the subprogram 40 with the size of the logic segment 31, a logic segment producing means 12 for assigning the logic segment 31 to the region 41, a logic segment register means 13 forming a connection of the subprogram 40 with the logic segment 31, a logic segment retrieval means 14 for retrieving the logic segment 31 with the subprogram 40 being assigned, a logic segment delete means 15 for releasing the logic segment 31 with the subprogram 40 being assigned, a subprogram management table 20 stored with related information of the sub-program 40 and the logic segment 31, a physical segment management table 21 stored with related information of the physical segment 30 and the logic segment 31, and a dynamic link control table 2 including a logic segment management table 22 storing information information of each logic segment 31 and related information between the logic segments 31.

Figure 2:
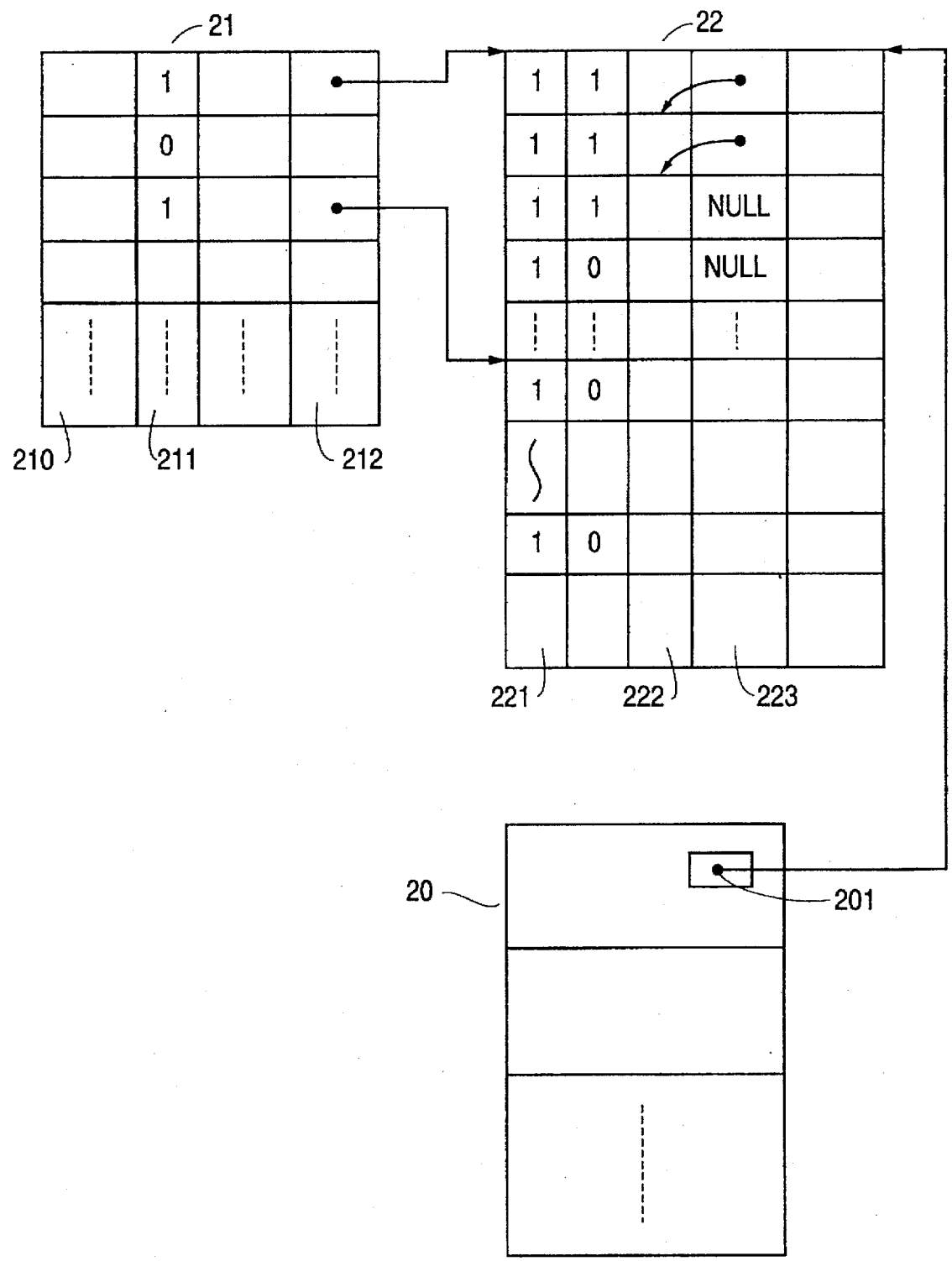
FIG. 2 is a view showing relationship between a physical segment management table 21, a logic segment management table 22, and subprogram management table 20 in a dynamic link control table 2 in an embodiment according to the invention.

In FIG. 2, each entry of the physical segment management table 21 includes an in-use flag 210 designating whether or not the physical segment corresponding to the entry is now in use, a logic segment presence flag 211 designating whether or not the physical segment has the logic segment, and a logic segment management or supervising pointer 212 which has an address of the entry of the logic segment management table corresponding to the logic segment which the physical segment possesses.

In each entry of the logic segment management table 22, in an amount corresponding to one physical segment continues an entry including: an effective flag 221 designating whether or not the entry is effective, an in-use flag 222 designating whether or not the logic segment corresponding to the entry is now in use, and a next entry chain 223 which is an address of an entry corresponding to the logic segment next to the same subprogram.

Each entry of the subprogram management table 20 has a logic segment chain pointer 201 which is an address of an entry corresponding to the logic segment that the subprogram possesses.

Figure 3A:
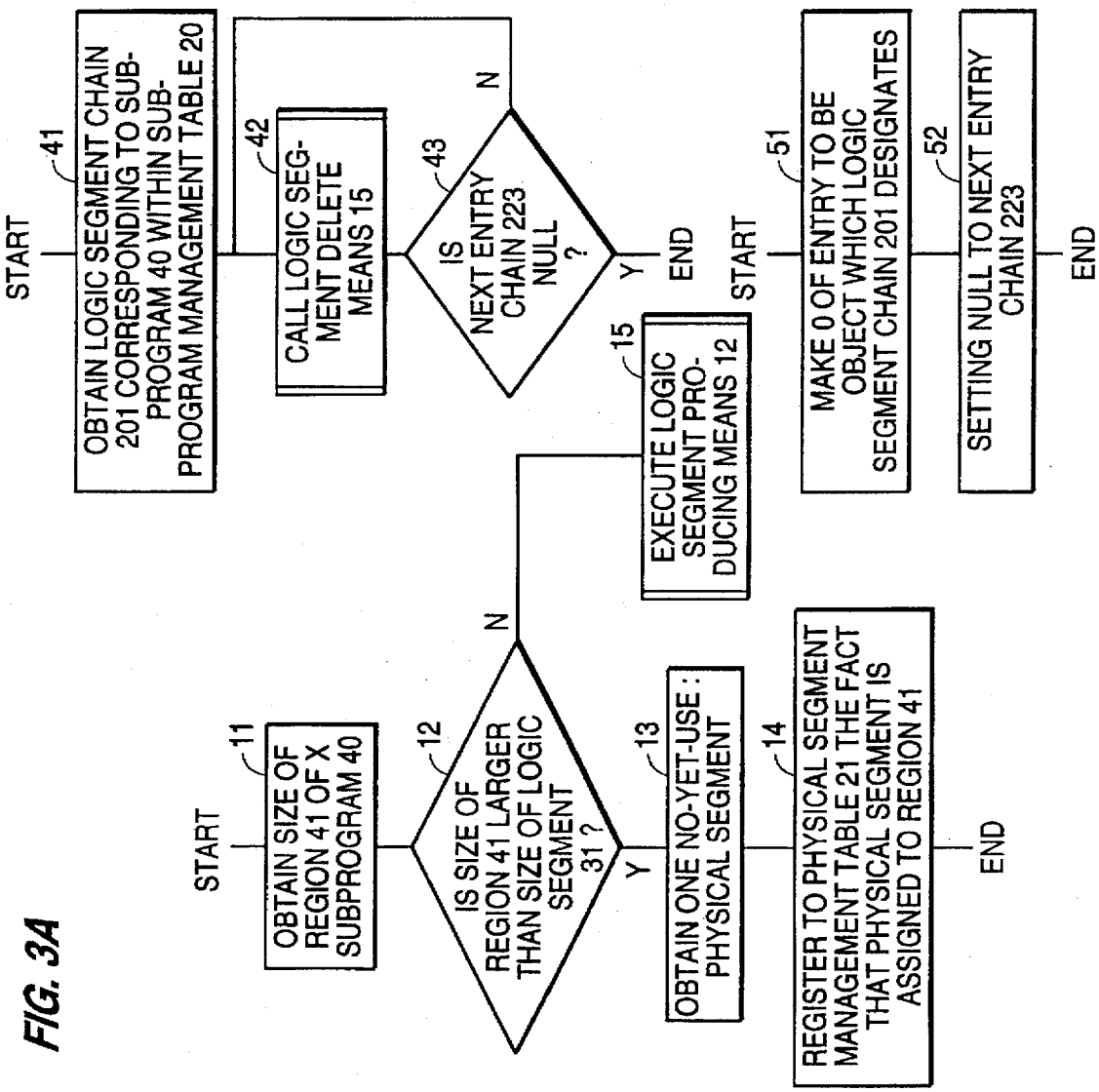
FIG. 3A is a flow chart showing the processes of segment size decision means 11, logic segment retrieval means 14, and logic segment delete means 15 of FIG. 1 in an embodiment according to the invention.

Operation of the embodiment according to the invention is described referring to FIGS. 1 to 3.

On dynamic linking of the subprogram 40, the segment size decision means 11 is started first from a dynamic link function in order to determine a segment to be assigned to a region 41 that the subprogram 40 possesses.

The segment size decision means 11 proceeds first to obtain the size of the region 41 to which the segment is assigned (step 11), to compare it with the size of the logic segment 31 (step 12), and when the region 41 size is larger than the size of the logic segment 31, then to obtain one "not-yet-use" or unused physical segment and to assign it to the region 41 (step 13), and to supply "1" to the in-use flag 210 of an entry corresponding to the physical segment of the physical segment management table 21 (step 14).

When the size of the region 41 is smaller than the size of the logic segment 31, the logic segment producing means 12 is started (step 15).

The logic segment producing means 12 retrieves from the logic segment management table 22 an entry which is effective (the effective flag 221 is "1") and is simultaneously in a not-in-use state (in-use flag 222 is "0") (step 21).

The logic segment producing means 12 proceeds, after step 21, to determine the result of retrieval in step 21 (step 22), and if it determines a success of the retrieval, to supply "1" to the in-use flag 222 of a head entry of a thus retrieved entry group (step 23), and to start the logic segment register means 13 (step 24).

The logic segment producing means 12 proceeds, if determining a failure of retrieval in step 22, to obtain one not-in-use physical segment (step 25), and to supply a "1" to the in-use flag 210 of an entry corresponding to the physical segment of the physical segment management table 21 (step 26).

The logic segment producing means 12 proceeds, after step 26, to continuously ensure an ineffective (the effective flag 221 is "0") entry in an amount corresponding to one physical segment from the logic segment supervising table 22 (step 27), and to supply a "1" to the effective flag 221 of a thus ensured entry group (step 28), thereby a head address of the secured entry group is set to the logic segment management pointer 212 of the secured entry secured in step 26 of the physical segment management table 21 (step 29).

The logic segment producing means 12 proceeds, after step 29, to return to step 21.

By the logic segment register means 13, a value of the logic segment chain pointer 201 corresponding to the subprogram 40 within the subprogram management table 20 is set to the next entry chain 223 to an entry of the logic segment management table 22 secured in step 23 (step 31), and an address of the entry is set to the logic segment chain pointer 201 (step 32).

If the subprogram 40 is deleted, the logic segment retrieval means 14 is started.

The logic segment retrieval means 14 obtains the logic segment chain 201 corresponding to the subprogram 40 within the subprogram management table 20 (step 41), and calls the logic segment delete means 15 (step 42).

The logic segment delete means 15 supplies "0" to the in-use flag 222 of an object entry designated by the logic segment chain 201 (step 51), and sets NULL to the next entry chain 223 (step 52). The logic segment delete means 15, after step 52, returns to the logic segment retrieval means 14.

The logic segment retrieval means 14, on returning from the logic segment delete means 15, determines whether or not the next entry chain 223 that the logic segment delete means 15 has obtained is NULL (step 43), and if it is not determined as NULL, the control proceeds to return to step 42. If it is determined as NULL in step 43, the process is terminated.

In the foregoing, the process of segment division management system of the embodiment according to the invention is completed.

A feature of the segment division management system of one embodiment according to the invention resides in that one physical segment 30 is divided into a plurality of logic segments 31 each with a fixed length, the logic segment management of table 22 for management each logic segment 31 is provided, and in registering the sub-program 40, the logic segment 31 is assigned with the smaller sized region by the segment size decision means 11, the logic segment producing means 12, and the logic segment register means 13. In deleting the subprogram 40, any logic segment 31 which is not used is deleted by the logic segment retrieval means 14 and the logic segment delete means 15.

In effect, the segment division management system of one embodiment according to the invention permits more subprograms 40 to utilize a virtual storage space without resulting in a lack of an amount of virtual storage space on dynamic linking of the subprogram 40 since the virtual storage space is intended to be assigned to the subprogram 40 at the unit of logic segment 31 obtained by dividing the physical segment 30, in comparison with the conventional system in which one physical segment is assigned to one subprogram.

As hereinbefore fully described, the invention is advantageously capable of upgrading the utilization efficiency of the physical segment constituting a virtual storage space and, as a result, improving the utilization efficiency of the virtual storage space.

Although the invention has been described in detail above in connection with various preferred embodiments thereof, it will be appreciated by those skilled in the art that these embodiments have been provided solely for purposes of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. A segment division management system in a computer system employing a virtual storage management system by a segmentation system, comprising:

a physical segment comprising a virtual storage space including a plurality of logic segments, each logic segment having a selected fixed length;

a subprogram dynamically linked to a main program and possessing a plurality of regions;

segment size decision means for comparing a size of a region which the subprogram possesses with a size of a logic segment and for determining whether the region is smaller than the logic segment;

logic segment producing means for assigning, when the segment size decision means determines the region is smaller than the logic segment, a not-yet-use logic segment to the region which the subprogram possesses.

2. A segment division management system as claimed in claim 1, further comprising:

logic segment retrieval means for retrieving a logic segment to which a subprogram to be deleted is assigned, and logic segment release means for returning the logic segment to a not-yet-use status.

3. A segment division management system in a computer system employing a virtual storage management system by a segmentation system comprising:

a physical segment comprising a virtual storage space including a plurality of logic segments, each logic segment having a selected fixed length;

a subprogram dynamically linked to a main program and possessing a plurality of regions;

segment size decision means for comparing a size of a region which the subprogram possesses with a size of a logic segment, for determining whether the size of the region which the subprogram possesses is larger than the size of the logic segment; and logic segment producing means for assigning, when the segment size decision means determines the size of the region is smaller than the size of the logic segment, a not-yet-use logic segment to the region which the subprogram possesses.

4. A segment division management system as claimed in claim 3, further comprising:

logic segment retrieval means for retrieving a logic segment to which a subprogram to be deleted is assigned; and logic segment release means for returning the logic segment to a not-yet-use status.

5. A segment division management system in a computer system employing a virtual storage management system by a segmentation system comprising:

a physical segment comprising a virtual storage space including a plurality of logic segments each logic segment having a selected fixed length;

a physical segment management table stored with information related to the physical segment and each logic segment;

a logic segment management table stored with information related to each logic segment and related information between the logic segments;

a subprogram dynamically linked to a main program and possessing a plurality of regions;

a subprogram management table stored with related information between the subprogram and each logic segment;

segment size decision means for determining that a size of a region which the subprogram possesses is smaller than a size of a logic segment;

logic segment producing means for retrieving, when a size of a region which the subprogram possesses is smaller than a size of a logic segment, a not-yet-use logic segment from the logic segment management table, and for assigning the not-yet-use logic segment to the region which the subprogram possesses, and for registering to the physical segment management table the fact that the logic segment is assigned to the region; and logic segment register means for registering to the subprogram management table the fact that the logic segment is assigned to the region which the subprogram possesses.

6. A segment division management system as claimed in claim 5, further comprising:

logic segment retrieval means for retrieving a logic segment to which a subprogram to be deleted is assigned; and logic segment release means for returning the logic segment to a not-yet-use status.

7. A segment division management system in a computer system employing a virtual storage management system by a segmentation system, comprising:

a physical segment comprising a virtual storage space including a plurality of logic segments, each logic segment the physical segment into a plurality of having a selected fixed length;

a logic segment management table including an effective flag designating whether or not each entry constituting each logic segment is effective, an in-use flag designating whether or not each entry is now in use, and a next entry chain which is a pointer showing a next entry;

a physical segment management table including an in-use flag designating whether or not each physical segment is now in use, a logic segment presence flag designating whether or not a logic segment corresponding to each physical segment is present, and a logic segment management pointer which is a pointer to an entry of the logic segment management table corresponding to each physical segment;

a subprogram dynamically linked to a main program and possessing a plurality of regions;

a subprogram management table including a logic segment chain pointer which is a pointer to a logic segment to which the subprogram is assigned;

segment size decision means for comparing a region which the subprogram possesses with the size of a logic segment, for determining whether the size of the region which the subprogram possesses is larger than the size of the logic segment, and for assigning a not-yet-use physical segment to the region which the subprogram possesses, the in-use flag of an entry corresponding to the physical segment of the physical segment management table being rendered to a in-use status logic segment producing means for retrieving, when the segment size decision means determines a size of a region is smaller than a size of a logic segment, an entry in which the effective flag is effective and the in-use flag is not in use, from the logic segment management table, and when failing to retrieve the entry, the logic segment producing means proceeds to assign a not-yet-use physical segment to a region which the subprogram possesses, to render into an in-use status the in-use flag of an entry corresponding to the physical segment of the physical segment management table, simultaneously to render the logic segment presence flag to a presence status, further to continuously secure from the logic segment management table an entry, in an amount corresponding to one physical segment, where the effective flag is not effective, furthermore to render the effective flag of an entry group to be effective, to render the in-use flag of the entry group to be an in-use status, and to set a head address of the entry group to the logic segment management pointer of the entry of the physical segment management table; and logic segment register means for setting a head address of an entry corresponding to the subprogram of the logic segment management table to the logic segment chain pointer of an entry corresponding to the subprogram of the subprogram management table.

8. A segment division management system as claimed in claim 7, further comprising:

logic segment retrieval means for retrieving all entries, corresponding to the subprogram within the logic segment management table, which are designated by the logic segment chain of the entry within the subprogram management table corresponding to a subprogram to be deleted; and logic segment release means for rendering the in-use flag of all the entries which the logic segment retrieval means retrieves to a not-in-use status, and further for setting NULL to the next entry chain.

* * * * *